H. MILLER & G. B. HALLENBECK.
COMBINED TRAP NEST AND BROODER.
APPLICATION FILED APR. 19, 1909.
938,603.
Patented Nov. 2, 1909.
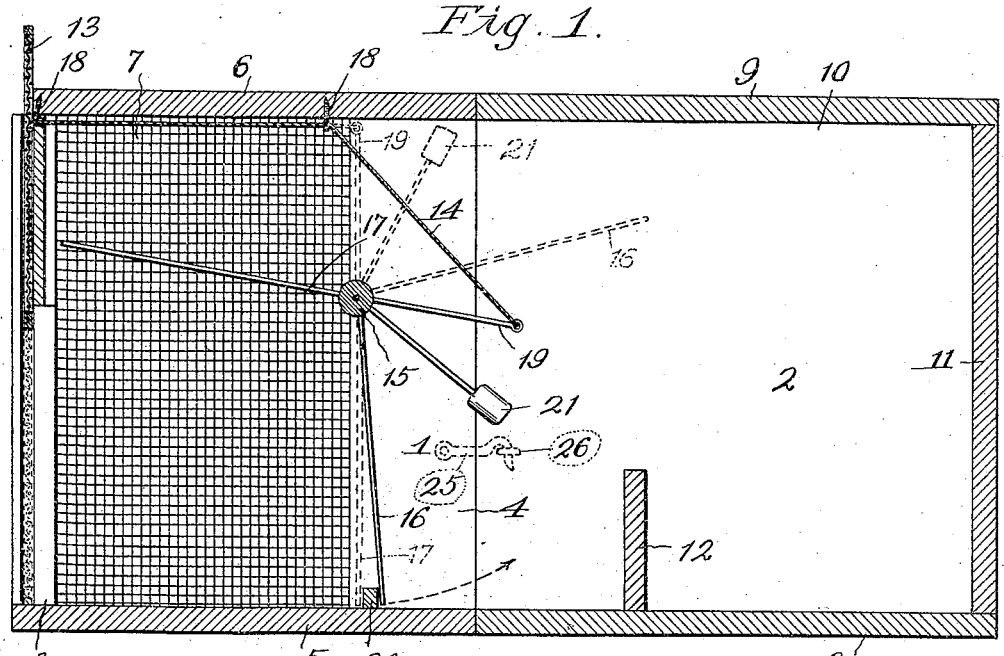
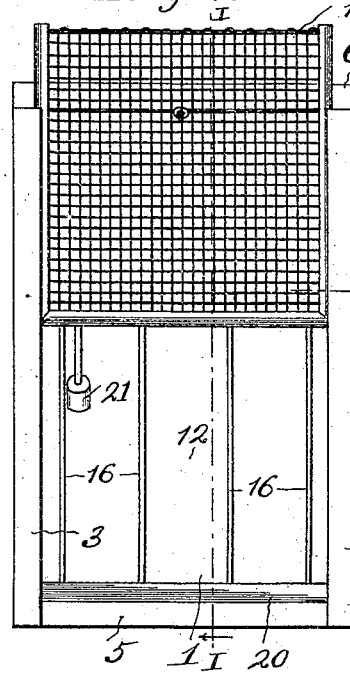
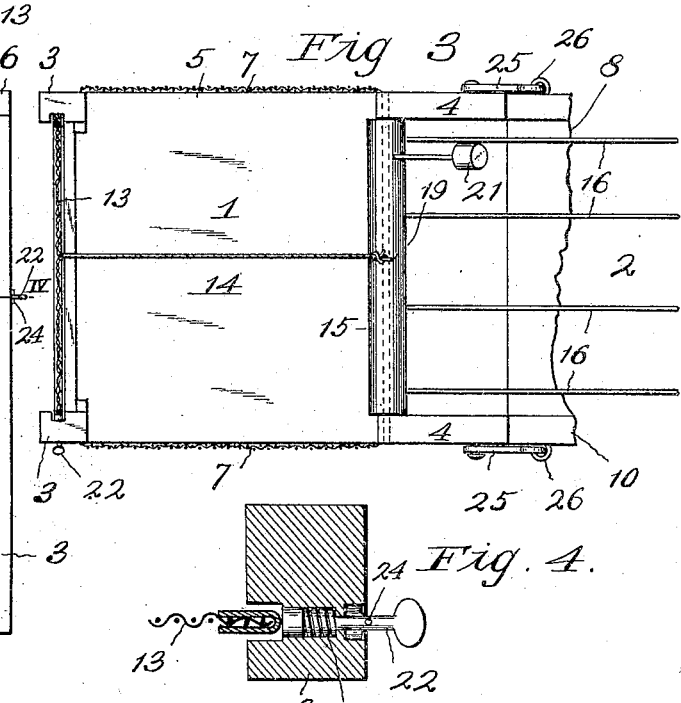

UNITED STATES PATENT OFFICE.

HARRY MILLER, OF KANSAS CITY, KANSAS, AND GEORGE B. HALLENBECK, OF KANSAS CITY, MISSOURI.

COMBINED TRAP-NEST AND BROODER.

938,603.  Specification of Letters Patent.  Patented Nov. 2, 1909.

Application filed April 19, 1909. Serial No. 490,895.

*To all whom it may concern:*

Be it known that we, HARRY MILLER and GEORGE B. HALLENBECK, citizens of the United States, residing at Kansas City, in the county of Wyandotte and State of Kansas, and Kansas City, in the county of Jackson and State of Missouri, respectively, have invented certain new and useful Improvements in Combined Trap - Nests and Brooders, of which the following is a specification.

Our invention relates to a combined trap-nest and brooder, and our object is to provide a novel structure of this character which is simple in construction and well adapted for the purpose intended.

With the above and other objects in view, the invention may be said to consist in the novel construction, arrangement, and combination of parts hereinafter described, pointed out in the claims, and illustrated in the accompanying drawing, in which:

Figure 1 represents a vertical longitudinal section of the structure on line I—I of Fig. 2. Fig. 2 is a front elevation of the structure. Fig. 3 is a broken plan view with the top of the structure removed. Fig. 4 is an enlarged detail on line IV of Fig. 2.

In carrying out the invention, we employ a front compartment 1, and a rear compartment 2 which communicate with each other. The front compartment 1 consists of a pair of grooved standards 3, a pair of side pieces 4, a floor portion 5, a top portion 6, and wire-netting 7 for admitting light to the compartment.

The rear compartment 2 comprises a floor portion 8, a top portion 9, side portions 10, and a rear portion 11. It is also provided with a transverse partition 12 to prevent the straw forming the nest in said compartment from becoming scattered on the floor of the front compartment, and thereby interfering with the operation of an oscillatory wicket, controlling the entrance to the rear compartment.

13 designates a trap - door slidably arranged in the grooved standards for the purpose of controlling the entrance to the front compartment 1. Said trap-door is actuated through the intermediacy of a cable 14, by the oscillatory wicket which comprises a shaft 15, a set of wires 16, and a set of wires 17, which latter extend at an oblique angle to the former, and like the same are secured to the shaft 15, which is journaled in the side pieces 4. Cable 14 extends through a pair of guides 18, and is attached at its ends to the trap-door 13 and a crank-arm 19, projecting rearwardly from shaft 15.

20 designates a stop extending across the floor portion 5 to limit the oscillatory movement of the wicket.

21 designates a counter-weight secured to the wicket-shaft 15 to counterbalance the trap-door 13, so that the latter can easily be raised and lowered.

22 designates a bolt extending transversely through one of the standards 3, for the purpose of locking the trap-door 13 in a closed position, said bolt being forced inward to engage the top of the door by an expansion spring 23. Bolt 22 is provided with a stop-pin 24, so that when the bolt is drawn outwardly from the path of the door, and turned one-fourth of a revolution, said stop-pin will engage the adjacent side of standard 3, and hold the bolt in an inoperative position.

In practice we prefer to make the front compartment removable from the rear compartment, so that said front compartment may be used in connection with any ordinary box which may answer the purpose of a nest. We provide the sides of compartment 1 with a pair of hooks 25, adapted to engage a pair of staples 26 on the sides of the rear compartment for the purpose of detachably securing the compartments together.

The trap-door is normally left in a raised or open position so that a hen may readily gain access to the nest. In passing through the oscillatory wicket, wires 16 are engaged by the hen and the wicket is moved to the position shown by the dotted lines, Fig. 1, which operation permits the trap-door 13 to drop and close the entrance to the front compartment 1, so that the hen will not be disturbed by others while laying.

In leaving the nest, wires 17 are engaged and the wicket is restored to its initial position and in turn opens the trap-door 13, so that the hen can pass out.

When the structure is employed as a brooder, the hen is confined in the rear compartment 2 by locking the trap-door 13 in a closed position, through the instrumentality of bolt 22. This leaves the chicks free to pass between wires 17 and gain access either to the nest or compartment 1, which is well lighted through the wire-netting 7 and the trap-door, which is also constructed chiefly of wire-netting. At the same time the chicks are protected, as it is impossible for rodents, snakes, &c., to enter the compartment.

Having thus described our invention, what we claim is:

1. A structure of the character described consisting of front and rear compartments, a sliding trap-door controlling the entrance to the front compartment, an oscillatory wicket controlling the entrance to the rear compartment, means connecting the trap-door and the oscillatory wicket whereby the latter controls the former, and means carried by the oscillatory wicket to counterbalance the trap-door.

2. A structure of the character described consisting of front and rear compartments, a sliding door controlling the entrance to the front compartment, and an oscillatory member controlling the entrance to the rear compartment; a cable connecting the door and the oscillatory member whereby the latter controls the former, a counterweight on the oscillatory member to counterbalance the weight of the door, and a bolt for locking the door in a closed position.

In testimony whereof we affix our signatures, in the presence of two witnesses.

HARRY MILLER.
GEORGE B. HALLENBECK.

Witnesses:
F. G. FISCHER,
M. COX.